US006525118B2

(12) United States Patent
Hergenrother et al.

(10) Patent No.: US 6,525,118 B2
(45) Date of Patent: *Feb. 25, 2003

(54) PROCESSABILITY OF SILICA-FILLED RUBBER STOCKS WITH REDUCED HYSTERESIS

(75) Inventors: William L. Hergenrother, Akron, OH (US); William M. Cole, Clinton, OH (US); James Oziomek, Cuyahoga Falls, OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/985,859

(22) Filed: Dec. 5, 1997

(65) Prior Publication Data

US 2002/0002224 A1 Jan. 3, 2002

Related U.S. Application Data

(63) Continuation-in-part of application No. 08/893,875, filed on Jul. 11, 1997, now Pat. No. 6,369,138.

(51) Int. Cl.$^7$ ................................................. C08K 5/04
(52) U.S. Cl. .................. 524/111; 524/211; 524/216; 524/265; 524/261; 524/317; 524/423; 524/449; 524/451; 524/493; 524/531; 525/332.6
(58) Field of Search ..................... 524/311, 317, 524/531, 265, 111, 211, 449, 451, 423, 493, 216, 261; 525/332.6

(56) References Cited

U.S. PATENT DOCUMENTS

| | | | |
|---|---|---|---|
| 3,627,723 A | * 12/1971 | Kealy et al. ................. 264/211 |
| 3,717,600 A | * 2/1973 | Dalhuisen et al. .......... 252/309 |
| 3,737,334 A | 6/1973 | Doran |
| 3,768,537 A | 10/1973 | Hess et al. |
| 3,873,489 A | 3/1975 | Thurn |
| 3,881,536 A | 5/1975 | Doran, Jr. et al. |
| 3,884,285 A | 5/1975 | Russell et al. |
| 3,923,712 A | * 12/1975 | Vickery ....................... 106/296 |
| 3,938,574 A | 2/1976 | Burmester et al. |
| 3,978,103 A | 8/1976 | Meyer-Simon et al. |
| 4,029,513 A | 6/1977 | Vessey et al. ........... 106/288 B |
| 4,076,550 A | 2/1978 | Thurn et al. |
| 4,143,027 A | 3/1979 | Sollman et al. |
| 4,179,537 A | 12/1979 | Rykowski |
| 4,201,698 A | 5/1980 | Itoh et al. |
| 4,229,333 A | 10/1980 | Wolff et al. |
| 4,297,145 A | 10/1981 | Wolff et al. |
| 4,431,755 A | 2/1984 | Weber et al. |
| 4,433,013 A | 2/1984 | Pühringer |
| 4,436,847 A | 3/1984 | Wagner |
| 4,463,120 A | * 7/1984 | Collins et al. ............... 524/274 |
| 4,474,908 A | 10/1984 | Wagner |
| 4,482,657 A | 11/1984 | Fischer et al. ............... 523/334 |
| 4,623,414 A | * 11/1986 | Collins et al. ........... 156/307.5 |
| 4,629,758 A | * 12/1986 | Kawaguchi et al. ......... 524/495 |
| 4,906,680 A | * 3/1990 | Umeda et al. ............... 524/183 |
| 4,937,104 A | 6/1990 | Pühringer |
| 5,057,601 A | 10/1991 | Schiessl et al. |
| 5,066,721 A | 11/1991 | Hamada et al. |
| 5,159,009 A | 10/1992 | Wolff et al. |
| 5,178,676 A | 1/1993 | Lackey et al. |
| 5,227,425 A | 7/1993 | Rauline |
| 5,227,431 A | 7/1993 | Lawson et al. .............. 525/237 |
| 5,317,051 A | 5/1994 | Harashige et al. ........... 524/310 |
| 5,328,949 A | 7/1994 | Sandstrom et al. |
| 5,336,730 A | 8/1994 | Sandstrom et al. |
| 5,426,136 A | * 6/1995 | Waddell et al. .............. 523/200 |
| 5,502,131 A | 3/1996 | Antkowiak et al. ......... 526/180 |
| 5,508,333 A | 4/1996 | Shimizu |
| 5,514,756 A | 5/1996 | Hsu et al. ................. 525/332.5 |
| 5,521,309 A | 5/1996 | Antkowiak et al. |
| 5,552,473 A | 9/1996 | Lawson et al. |

(List continued on next page.)

FOREIGN PATENT DOCUMENTS

| CA | 2177095 | 5/1996 |
| CA | 2184932 | 3/1997 |
| CA | 2242310 | 1/1999 |

(List continued on next page.)

OTHER PUBLICATIONS

Abstract—XP002080985, Sep. 6, 1988, Derwent Publications Ltd., London, Great Britain.

*Primary Examiner*—Judy M. Reddick
(74) *Attorney, Agent, or Firm*—Meredith Palmer; Barbara Arndt

(57) ABSTRACT

A silica-filled, vulcanized elastomeric compound comprises 100 parts by weight of an elastomer; from about 5 to about 100 parts by weight of a reinforcing filler per 100 parts of elastomer, wherein the reinforcing fillers are selected from the group consisting of carbon black and silica filler; from 0 to about 20 percent by weight of a silane, based upon the weight of the silica filler; a cure agent; from about 0 to about 20 parts by weight of a processing aid selected from the group consisting of fatty acid esters of hydrogenated and non-hydrogenated $C_5$ and $C_6$ sugars; from about 0 to about 20 parts by weight of a processing aid selected from the group consisting of polyoxyethylene derivatives of fatty acid esters of hydrogenated and non-hydrogenated $C_5$ and $C_6$ sugars; from about 0 to about 40 parts by weight of an additional filler other than silica or carbon black, with the provisos that at least one of the processing aids or additional fillers are present; that if the processing aid is sorbitan monooleate, then at least one of the polyoxyethylene derivatives or additional fillers is also present and, that the minimal amount for each processing aid and additional filler, if present, is about one part by weight. A process for the preparation of silica filled vulcanizable elastomers is provided as well as pneumatic tires employing tread stock comprising the novel vulcanizable elastomers.

9 Claims, 1 Drawing Sheet

U.S. PATENT DOCUMENTS

| | | | |
|---|---|---|---|
| 5,569,697 A | 10/1996 | Ferrandino et al. | |
| 5,574,109 A | 11/1996 | Lawson et al. | |
| 5,580,919 A | 12/1996 | Agostini et al. | |
| 5,591,794 A | 1/1997 | Fukumoto et al. | |
| 5,610,221 A | 3/1997 | Waddell et al. | |
| 5,610,227 A | 3/1997 | Antkowiak et al. | |
| 5,610,237 A | 3/1997 | Lawson et al. | |
| 5,616,655 A | 4/1997 | D'Sidocky et al. | 525/342 |
| 5,659,056 A | 8/1997 | Hergenrother et al. | |
| 5,674,932 A | 10/1997 | Agostini et al. | |
| 5,679,728 A | 10/1997 | Kawazura et al. | |
| 5,686,523 A | 11/1997 | Chen et al. | |
| 5,708,053 A | 1/1998 | Jalics et al. | |
| 5,714,533 A | 2/1998 | Hatakeyama et al. | 524/140 |
| 5,717,022 A * | 2/1998 | Beckmann et al. | 524/493 |
| 5,719,207 A | 2/1998 | Cohen et al. | |
| 5,723,531 A | 3/1998 | Visel et al. | |
| 5,741,858 A | 4/1998 | Brann et al. | |
| 5,763,388 A | 6/1998 | Lightsey et al. | |
| 5,777,013 A * | 7/1998 | Gardiner et al. | 524/274 |
| 5,780,537 A | 7/1998 | Smith et al. | |
| 5,780,538 A | 7/1998 | Cohen et al. | |
| 5,798,419 A | 8/1998 | Ruiz Santa Quiteria et al. | 525/370 |
| 5,804,636 A | 9/1998 | Nahmias et al. | |
| 5,804,645 A | 9/1998 | Matsuo | |
| 5,866,650 A | 2/1999 | Lawson et al. | 524/572 |
| 5,872,171 A | 2/1999 | Detrano | |
| 5,872,176 A | 2/1999 | Hergenrother et al. | 524/494 |
| 5,872,178 A | 2/1999 | Kansupada et al. | |
| 5,872,179 A | 2/1999 | Hubbell | |
| 5,877,249 A | 3/1999 | Lambotte | |
| 5,883,179 A | 3/1999 | Kawazoe et al. | |
| 5,886,074 A | 3/1999 | Sandstrom et al. | |
| 5,886,086 A | 3/1999 | Hubbell et al. | |
| 5,898,047 A | 4/1999 | Howald et al. | |
| 5,912,374 A | 6/1999 | Agostini et al. | |
| 5,914,364 A | 6/1999 | Cohen et al. | |
| 5,916,961 A | 6/1999 | Hergenrother et al. | 524/572 |
| 5,916,973 A | 6/1999 | Zimmer et al. | |
| 5,916,981 A | 6/1999 | Nahmias et al. | |
| 5,929,149 A | 7/1999 | Matsuo et al. | 524/262 |
| 6,008,295 A | 12/1999 | Takeichi et al. | 525/105 |
| 6,022,922 A | 2/2000 | Bergh et al. | 524/492 |
| 6,046,266 A | 4/2000 | Sandstrom et al. | 524/492 |
| 6,053,226 A | 4/2000 | Agostini | 152/209.5 |
| 6,080,809 A | 6/2000 | Stuhldreher | 524/447 |
| 6,180,710 B1 | 1/2001 | Hergenrother et al. | 524/494 |
| 6,221,943 B1 | 4/2001 | Hergenrother et al. | 524/265 |
| 6,228,908 B1 | 5/2001 | Taleichi et al. | 524/27 |

FOREIGN PATENT DOCUMENTS

| | | |
|---|---|---|
| CA | 2242383 | 1/1999 |
| CA | 2242783 | 1/1999 |
| CA | 2242797 | 1/1999 |
| CA | 2242800 | 1/1999 |
| CA | 2242801 | 1/1999 |
| CA | 2243091 | 1/1999 |
| CH | 299373 | 8/1954 |
| DE | 29 05 977 A | 8/1979 |
| DE | 43 08 311 A | 8/1979 |
| EP | 0 299 074 | 1/1989 |
| EP | 0 447 066 | 9/1991 |
| EP | 0 510 410 | 10/1992 |
| EP | 0 641 824 | 3/1995 |
| EP | 0 677 548 A1 | 7/1995 |
| EP | 0 744 437 A1 | 4/1996 |
| EP | 0 721 971 A1 | 7/1996 |
| EP | 0 754 710 | 1/1997 |
| EP | 0 761 734 | 3/1997 |
| EP | 0 765 904 | 4/1997 |
| EP | 0 767 179 | 4/1997 |
| EP | 0 795 577 A1 | 9/1997 |
| EP | 0 824131 | 2/1998 |
| EP | 0 864605 | 9/1998 |
| EP | 0 890 580 | 1/1999 |
| EP | 0 890 587 | 1/1999 |
| EP | 0 890 588 | 1/1999 |
| EP | 0 890 602 | 1/1999 |
| EP | 0 890 603 | 1/1999 |
| EP | 0 890 606 | 1/1999 |
| EP | 0 908 586 | 1/1999 |
| JP | 63-213536 | 9/1988 |
| JP | 1-110999 | 4/1989 |
| JP | 5-51484 | 3/1993 |
| JP | 94106340 | 4/1994 |
| JP | 6-248116 | 9/1994 |
| JP | 7118452 | 5/1995 |
| JP | 7292162 A | 11/1995 |
| JP | 8269294 | 10/1996 |
| JP | 8337688 | 12/1996 |
| JP | 9087427 | 3/1997 |

* cited by examiner

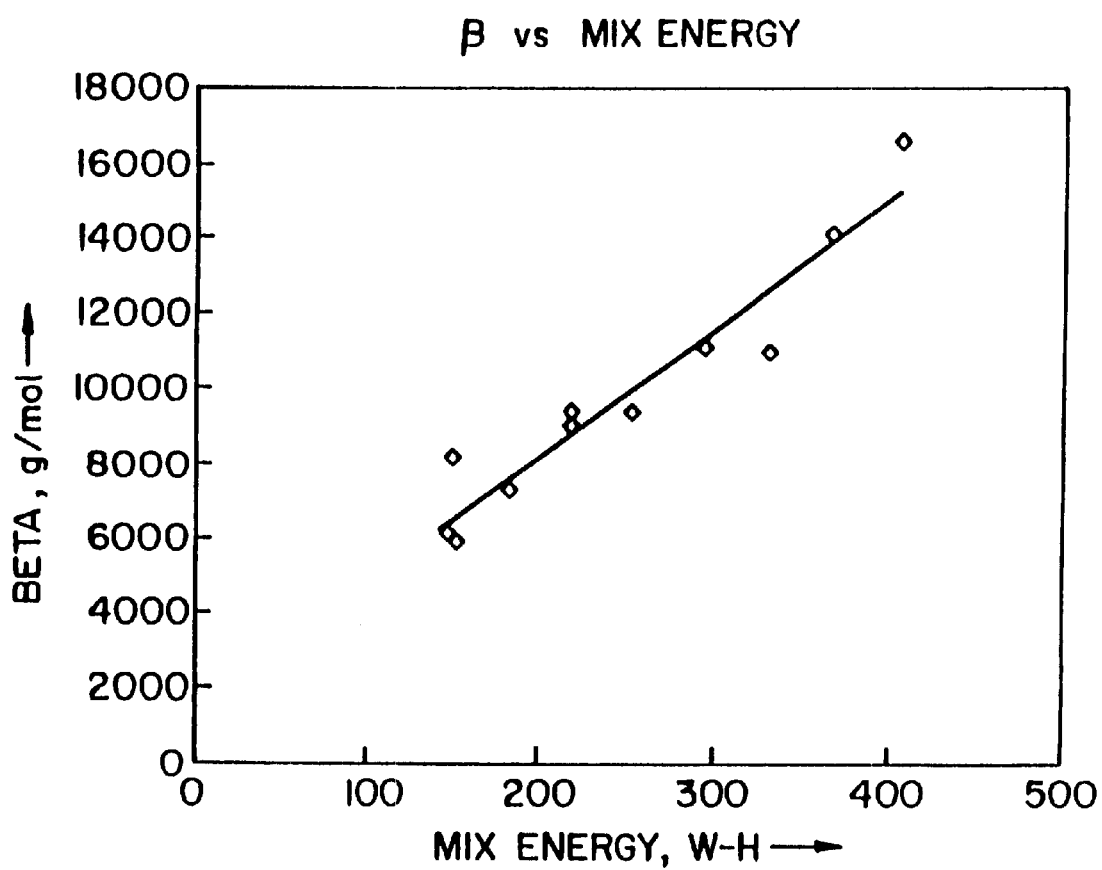

PROCESSABILITY OF SILICA-FILLED RUBBER STOCKS WITH REDUCED HYSTERESIS

CROSS-REFERENCE TO RELATED APPLICATIONS

This application is a continuation-in-part of U.S. Ser. No. 08/893,875, filed Jul. 11, 1997 now U.S. Pat. No. 6,369,138.

TECHNICAL FIELD

The subject invention relates to the processing and vulcanization of diene polymer and copolymer elastomer-containing rubber stocks. More specifically, the present invention relates to the processing and vulcanization of diene polymer and copolymer elastomer-containing, silica-filled rubber stocks using a fatty acid ester of hydrogenated and non-hydrogenated sugars as a processing aid.

In another embodiment, the present invention relates to the processing and vulcanization of diene polymer and copolymer elastomer-containing, silica-filled rubber stocks containing additional mineral fillers.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lower fuel consumption for vehicles using such tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Previous attempts at preparing readily processable, vulcanizable, silica-filled rubber stocks containing natural rubber or diene polymer and copolymer elastomers have focused upon the sequence of adding ingredients during mixing (Bomal, et al., *Influence of Mixing procedures on the Properties of a Silica Reinforced Agricultural Tire Tread*, May 1992), the addition of de-agglomeration agents such as zinc methacrylate and zinc octoate, or SBR-silica coupling agents such as mercapto propyl trimethoxy silane (*Hewitt, Processing Technology of Silica Reinforced SBR, Elastomerics*, pp 33–37, March 1981), and the use of bis[3-(triethoxysilyl) propyl]tetrasulfide (Si69) processing aid (Degussa, PPG).

The use of Si69 processing aid in the formulation of silica-filled rubber stocks has been successful, but generally requires a large amount of the additive, such as 10% by weight based on the weight of silica, in order to be effective.

Precipitated silica has been increasingly used as a reinforcing particulate filler in carbon black-filled rubber components of tires and mechanical goods. Silica-loaded rubber stocks, however, exhibit relatively poor processability.

The present invention provides a fatty acid ester of hydrogenated and non-hydrogenated sugars for use as a processing aid for silica-filled rubber stocks, which greatly improves the processability and properties of the formulations and the resulting vulcanized product. In another embodiment, the present invention further provides additional mineral fillers for use in silica-filled elastomeric rubber stocks, improving tear strength and lowering hysteresis.

SUMMARY OF THE INVENTION

It is therefore an object of the present invention to provide processing aids which improve the processability of formulations of diene polymer elastomers reinforced with silica-filler.

It is another object of the present invention to provide mineral and non-mineral fillers which improve the processability of formulations of diene polymer elastomers reinforced with silica-filler.

It is another object of the present invention to provide formulations of diene polymer elastomers reinforced with silica-filler having improved processability with decreased levels silanes.

It is yet another object of the present invention to provide a process for improving the processability of formulations of diene polymer elastomers reinforced with silica-filler.

It is another object of the present invention to provide a process for reducing the viscosity of silica-filled elastomeric vulcanizable compounds.

It is still another object of the present invention to provide a process for decreasing the level of silanes in silica-filled elastomeric vulcanizable compounds.

It is another object of the present invention to provide vulcanizable silica-filled elastomeric compounds having enhanced physical properties, including decreased hysteresis and increased tear strength.

At least one or more of the foregoing objects, together with the advantages thereof over the existing art, which shall become apparent from the specification which follows, are accomplished by the invention as hereinafter described and claimed.

The present invention provides a process for the preparation of a silica-filled, vulcanized elastomeric compound comprising mixing an elastomer with from about 5 to about 100 parts by weight of a reinforcing filler per 100 parts of elastomer, wherein the reinforcing fillers are selected from the group consisting of carbon black and silica filler; from 0 to about 20 percent by weight of a silane, based upon the weight of the silica filler; a cure agent; from about 0 to about 20 parts by weight of a processing aid selected from the group consisting of fatty acid esters of hydrogenated and non-hydrogenated $C_5$ and $C_6$ sugars; from about 0 to about 20 parts by weight of a processing aid selected from the group consisting of polyoxyethylene derivatives of fatty acid esters of hydrogenated and non-hydrogenated $C_5$ and $C_6$ sugars; from about 0 to about 40 parts by weight of an additional filler other than silica or carbon black, with the provisos that at least one of the processing aids or additional fillers are present; that if the processing aid is sorbitan monooleate, then at least one of the polyoxyethylene derivatives or additional fillers is also present and, that the minimal amount for each processing aid and additional filler, if present, is about one part by weight; and, effecting vulcanization.

The present invention further provides a vulcanizable silica-filled compound comprising 100 parts by weight of an elastomer; from about 5 to about 100 parts by weight of a reinforcing filler per 100 parts of elastomer, wherein the reinforcing fillers are selected from the group consisting of carbon black and silica filler; from 0 to about 20 percent by weight of a silane, based upon the weight of the silica filler; a cure agent; from about 0 to about 20 parts by weight of a processing aid selected from the group consisting of fatty acid esters of hydrogenated and non-hydrogenated $C_5$ and $C_6$ sugars; from about 0 to about 20 parts by weight of a processing aid selected from the group consisting of polyoxyethylene derivatives of fatty acid esters of hydrogenated and non-hydrogenated $C_5$ and $C_6$ sugars; from about 0 to about 40 parts by weight of an additional filler other than silica or carbon black, with the provisos that at least one of the processing aids or additional fillers are present; that if the processing aid is sorbitan monooleate, then at least one of the polyoxyethylene derivatives or additional fillers is also present and, that the minimal amount for each processing aid and additional filler, if present, is about one part by weight.

The present invention further provides a pneumatic tire employing tread stock manufactured from the vulcanizable silica-filled compound of the present invention.

BRIEF DESCRIPTION OF THE DRAWING

The drawing FIGURE is a graph of Beta, an inverse measure of filler association or crosslink density, as a function of mix energy.

DETAILED DESCRIPTION OF THE PREFERRED EMBODIMENTS

According to the present invention, the polymerized elastomer, e.g., polybutadiene, polyisoprene and the like, and copolymers thereof with monovinyl aromatics such as styrene, alpha methyl styrene and the like, or trienes such as myrcene, is compounded to form the rubber stock. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinylnaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity ($ML_4$/212° F.) of from about 2 to about 150. The copolymers are preferably random copolymers which result from simultaneous copolymerization of the monomers, as is known in the art. Also included are non-functionalized cis-polybutadiene, ethylene-propylene-diene monomer (EPDM), emulsion styrene butadiene rubber, and natural rubber.

Initiators known in the art such as an organolithium initiator, preferably an alkyllithium initiator, can be employed to prepare the elastomer. More particularly, the initiators used in the present invention include N-lithiohexamethyleneimine, organolithium compounds such as n-butyllithium, tributyltin lithium, dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, di-piperidyl ethane, hexamethylphosphoramide, N-N'-dimethylpiperazine, diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator solution previously described. Alternatively, the monomer and coordinator can be added to the initiator. The procedure is carried out under anhydrous, anaerobic conditions. The reactants are heated to a temperature of from about 10° C. to about 150° C. and are agitated for about 0.1 to about 24 hours. After polymerization is complete, the product is removed from the heat and terminated in one or more ways. To terminate the polymerization, a terminating agent, coupling agent or linking agent may be employed, all of these It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 150° C. to ensure complete reaction. Polymers terminated with a functional group as discussed hereinabove, are subsequently quenched with alcohol or other quenching agent as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the functionalized polymers are blended with conventional rubbers, the amounts can vary widely within a range comprising about 5 to about 99 percent by weight of the total rubber, with the conventional rubber or rubbers making up the balance of the total rubber (100 parts). It is to be appreciated that the minimum amount will depend primarily upon the degree of reduced hysteresis that is desired.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts by weight per 100 parts of polymer (phr), preferably in an amount from about 5 to about 80 phr. The useful upper range is limited by the high viscosity imparted by fillers of this type. Some of the commercially available silicas which may be used include: Hi-Sil® 215, Hi-Sil® 233, and Hi-Sil® 190, produced by PPG Industries. Also, a number of useful commercial grades of different silicas are available from De Gussa Corporation, Rhone Poulenc, and J. M. Huber Corporation.

Although the vulcanizable elastomeric compounds of the present invention are primarily silica-filled, the polymers can be optionally compounded with all forms of carbon black in amounts ranging from 0 to about 50 parts by weight, per 100 parts of rubber (phr), with about 5 to about 40 phr being preferred. When carbon is present, with silica, the amount of silica can be decreased to as low as about one phr, otherwise it too is present alone in at least 5 phr. As is known to those skilled in the art, elastomeric compounds as are discussed herein are typically filled to a volume fraction of about 25 percent which is the total volume of filler(s) added divided by the total volume of the elastomeric stock. Accordingly, while the minimum amounts expressed herein are operable, a useful range of reinforcing fillers i.e., silica and carbon black, is about 30 to 100 phr.

The carbon blacks may include any of the commonly available, commercially-produced carbon blacks but those having a surface area (EMSA) of at least 20 $m^2/gram$ and more preferably at least 35 $m^2/gram$ up to 200 $m^2/gram$ or higher are preferred. Surface area values used in this application are those determined by ASTM test D-1765 using the cetyltrimethyl-ammonium bromide (CTAB) technique.

Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in TABLE I hereinbelow.

TABLE I

| Carbon Blacks | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

Recognizing that carbon black may be used as an additional reinforcing filler with silica, the total amount of reinforcing filler(s) in the vulcanizable elastomeric compounds of the present invention ranges between about 30 to 100 phr, all of which can comprise silica or, mixtures with carbon black within the foregoing ranges. It is to be appreciated that as the amount of silica decreases, lower amounts of the processing aids of the present invention, plus silane, if any, can be employed.

When silica is employed as a reinforcing filler, it is customary to add a silane e.g., bis[3-(triethoxysilyl)propyl] tetrasulfide, to obtain good physical properties in a cured rubber stock containing silica as a filler. In general, the present invention provides a means to reduce or eliminate the level of silane. This material is commonly added to silica filled rubber formulations and will be referred to throughout this specification by its industry recognized designation, Si69, or simply as a silane. In addition, the present invention further provides maintenance of the processability of the compounded stock, as measured by Mooney viscosity, at the same level as achieved with high levels of silane. This replacement of the silane results in reduced cost and provides a material that is stable for storage and is easily added to rubber compounds. In addition, the use of vulcanizable elastomeric compounds according to the present invention provides the same or better physical properties upon curing. Generally, the amount of silane that is added ranges between about 4 and 20 percent by weight, based upon the weight of silica filler present in the elastomeric compound. By practice of the present invention, it is possible to reduce the amount of silane down to about 5 percent, more preferably, 3 to 1 percent and most preferably, to eliminate its presence totally i.e., 0 percent. It may also be desirable to increase processability of the silica filled elastomer compounds without any decrease in silane content which can be accomplished by the addition of a processing aid or filler according to the present invention as is described hereinafter.

The present invention utilizes the presence of one or more processing aids to replace the silane (Si69) to give equal processability of the vulcanizable compound, and better hot tear strength and lower hysteresis of the vulcanized rubber stock, without loss of the other measured physical properties. The processing aids are air stable and do not decompose. They are lower in cost and more storage stable than the silane, and when used with silica filled elastomers, give similar reduction of $ML_4$, and tan δ with an increase in tear strength.

The processing aids useful according to the present invention include fatty acid esters of hydrogenated and non-hydrogenated $C_5$ and $C_6$ sugars e.g., sorbitose, mannitose and arabinose. These compounds have at least three hydroxyl groups and from one to 3.5 ester groups (sesqui esters). Also useful are the polyoxyethylene derivatives thereof. The esterified hydrogenated and non-hydrogenated sugars can be described generally by the following formula using sorbitol as the representative ester

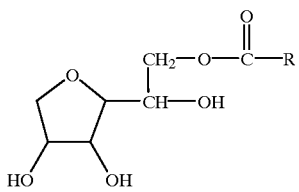

(I)

where R is derived from $C_{10}$ to $C_{22}$ saturated and unsaturated fatty acids, for example, stearic, lauric, palmitic, oleic and the like.

Representative examples include the sorbitan oleates, including monooleate, dioleate, trioleate and sesquioleate, as well as sorbitan esters of laurate, palmate and stearate fatty acids, and polyoxyethylene derivatives thereof, and other polyols and, more particularly, glycols, such as polyhydroxy compounds, and the like. Of these, sorbitan oleates are preferred, with sorbitan monooleate being most preferred. In similar fashion, other esters can be formed with mannitose and arabinose. Generally, the amount of this processing aid that is employed ranges from 0 to about 20 parts by weight, phr, with from about one to about 10 phr being preferred. These processing aids are commercially available from ICI Specialty Chemicals under the tradename SPAN, which is a registered trademark of ICI. Several useful products include SPAN 60 (sorbitan stearate); SPAN 80 (sorbitan oleate) and SPAN 85 (sorbitan tri-oleate). Other commercially available sorbitans can be used for example, the sorbitan monooleates known as Alkamuls SMO; Capmul O; Glycomul O; Arlacel 80; Emsorb 2500 and, S-Maz 80. Similar products of other esters are likewise available.

The polyoxyethylene derivatives of the foregoing processing aids according to the present invention also include fatty acid esters of hydrogenated and non-hydrogenated $C_5$ and $C_6$ sugars e.g., sorbitose, mannitose and arabinose, and have at least three hydroxyl groups and from one to 3.5 ester groups (sesqui esters). The polyoxyethylene derived esterified hydrogenated and non-hydrogenated sugars can be described generally by the following formula again, using sorbitol as the representative ester

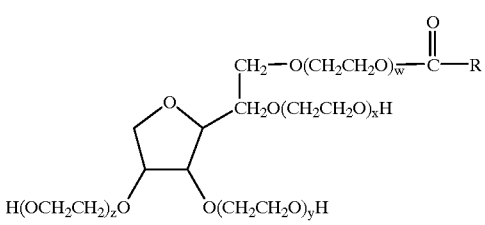

(II)

where R is derived from $C_{10}$ to $C_{22}$ saturated and unsaturated fatty acids, for example, stearic, lauric, palmitic, oleic and the like and the sum of w+x+y+z equals 20.

The polyoxyethylene derivatives of these processing aids, sometimes referred to as polysorbates and polyoxyethylene sorbitan esters, are analogous to the fatty acid esters of hydrogenated and non-hydrogenated sugars noted above (sorbitans) except that ethylene oxide units are placed on each of the hydroxyl groups. Representative examples of the polysorbates include POE (20) sorbitan monooleate; Polysorbate 80; Tween 80; Emsorb 6900; Liposorb O-20; T-Maz 80 and the like. The TWEENS are commercially available from ICI Specialty Chemicals, the tradename TWEEN being a registered trademark of ICI. Several useful products include TWEEN 60 [POE (20) sorbitan stearate]; TWEEN 80 [POE (20) sorbitan oleate]; TWEEN 85 [POE (20) sorbitan tri-oleate]; POE (20) sorbitan sesquioleate; POE (20) sorbitan laurate; POE (20) sorbitan palmate as well as TWEEN 20, TWEEN 21, TWEEN 60K, TWEEN 65, TWEEN 65K and TWEEN 81. Generally, the amount of this processing aid that is employed ranges from 0 to about 20 parts by weight, phr, with from about one to about 10 phr being preferred.

Finally, certain additional fillers can be utilized according to the present invention as processing aids which include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers are also optional and can be utilized in the amount of from 0 parts to about 40 parts per 100 parts of polymer (phr), preferably in an amount from about 1 to about 20 phr.

The selection of processing aid(s) and relative amounts for practice of the present invention includes the use of any one of the foregoing materials, as well as mixtures thereof, as noted hereinabove. Accordingly, various embodiments are possible as follows.

a) The use of fatty acid esters of hydrogenated and non-hydrogenated sugars alone, in amounts of up to 20 phr. These esters include all of the esterified sugars, but not sorbitan monooleate.

b) The use of polyoxyethylene derivatives of the fatty acid esters of hydrogenated and non-hydrogenated sugars alone, in amounts of up to 20 phr.

c) The use of a mineral or non-mineral filler alone or mixtures thereof, in amounts of up to 40 phr. It is to be understood that reference to these mineral and non-mineral fillers does not include the reinforcing fillers disclosed herein—carbon black and silica.

d) Mixtures of fatty acid esters of hydrogenated and non-hydrogenated sugars with the polyoxyethylene derivatives thereof, in an amount of up to 20 total phr, with a minimum of at least about one phr of either processing aid. When such mixtures are utilized, sorbitan monooleate can be employed.

e) Mixtures of fatty acid esters of hydrogenated and non-hydrogenated sugars with a mineral or non-mineral filler, as above, in an amount of up to 30 total phr, with a minimum of at least about one phr of the processing aid. When such mixtures are utilized, sorbitan monooleate can be employed.

f) Mixtures of polyoxyethylene derivatives of the fatty acid esters of hydrogenated and non-hydrogenated sugars with a mineral or non-mineral filler, as above, in an amount of up to 30 total phr, with a minimum of at least about one phr of the processing aid. When such mixtures are utilized, sorbitan monooleate can be employed.

g) Mixtures of fatty acid esters of hydrogenated and non-hydrogenated sugars with the polyoxyethylene derivatives thereof and with a mineral or non-mineral filler, as above, in an amount of up to 30 total phr, with a minimum of at least about one phr of either processing aid. When such mixtures are utilized, sorbitan monooleate can be employed.

While practice of the present invention includes the addition of at least one type of processing aid or an additional filler or combinations thereof, to be effective, preferably at least one part by weight of each type that is selected should be employed. Where only a processing aid or mixtures thereof are added, the upper limit is about 20 phr as contrasted with the use of an additional filler at an upper limit of about 40 phr. When a processing aid(s) is present with an additional filler, the upper limit total of these additives is about 30 phr. Irrespective of the upper limit amounts stated herein, it is to be appreciated that the combined total filler, that is, reinforcing fillers (silica and carbon black) plus additional fillers (other than silica and carbon black) will generally not exceed about 25 percent volume fraction. Accordingly, for an elastomeric stock containing additional fillers at the upper range of about 40 phr, the amount of reinforcing fillers will be lower than where additional fillers have not been added. Unexpectedly, we have found herein that physical properties do not fall off where addtitional filler or fillers are added and the amount of reinforcing fillers are lowered.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the elastomeric polymer with silica, optionally carbon black, as noted above, and one or more of the processing aids and optionally additional filler(s) according to the present invention, as well as other conventional rubber additives including for example, plasticizers, antioxidants, curing agents and the like, using standard rubber mixing equipment and procedures.

GENERAL EXPERIMENTAL

The present invention was demonstrated by comparing tread formulations as shown in TABLE II in which 3 parts per hundred rubber (phr) Si69 (control, C-C) were replaced with 7.5 phr of either an aromatic oil (C-A) or naphthenic oil (C-B). This replacement was further compared to a stock prepared according to the present invention with 3 phr of sorbitan monooleate and 4.5 phr aromatic oil (Sample 1).

TABLE II

Rubber Formulations to Evaluate Silica Modification and Physical Properties Obtained

| Materials | Amount (parts per hundred rubber) | | | |
|---|---|---|---|---|
| Sample | C-A | C-B | C-C | 1 |
| SBR | 75 | 75 | 75 | 75 |
| Natural Rubber | 25 | 25 | 25 | 25 |
| Silica | 30 | 30 | 30 | 30 |
| Carbon Black | 35 | 35 | 35 | 35 |
| Wax | 1 | 1 | 1 | 1 |
| Stearic Acid | 1.5 | 1.5 | 1.5 | 1.5 |
| Zinc Oxide | 3 | 3 | 3 | 3 |
| Accelerators | 2 | 2 | 2 | 2 |
| Antioxidant | 0.95 | 0.95 | 0.95 | 0.95 |
| Retarder | 0.25 | 0.25 | 0.25 | 0.25 |
| Varied Materials | | | | |
| Si69 Processing Aid | 0 | 0 | 3 | 0 |
| Sulfur | 2.7 | 2.7 | 1.7 | 2.7 |
| Aromatic Oil | 7.5 | 0 | 0 | 4.5 |
| Naphthenic Oil | 15 | 22.5 | 15 | 15 |
| Sorbitan Oleate | 0 | 0 | 0 | 3 |
| $ML_4$ @ 130° C. | 72 | 74 | 59 | 59 |
| M50 @ 25° C. (psi) | 271 | 295 | 236 | 241 |
| M300 @ 25° C. (psi) | 1750 | 1990 | 1970 | 1670 |
| Tensile @ 25° C. (psi) | 2380 | 2520 | 2410 | 2570 |
| % Elongation @ 25° C. | 383 | 361 | 349 | 419 |
| M200 @ 100° C. (psi) | 817 | 959 | 921 | 860 |
| Tensile @ 100° C. (psi) | 1270 | 1410 | 1300 | 1400 |
| % Elongation @ 100° C. | 280 | 266 | 256 | 290 |
| Tear Strength @ 171° C. (lb/in) | 98 | 95 | 99 | 120 |
| Tan δ @ 50° C. | 0.123 | 0.105 | 0.132 | 0.105 |

As can be seen in TABLE II, Sample 1 had better tear strength. The $ML_4$ @ 130° C. of Sample 1 has been reduced to the level of the control, C-C, and the 50° C. tan δ is lower than the Samples C-C or C-A and similar to that of Sample C-B.

A Mooney viscosity reduction of the vulcanizable compound by the sorbitan monooleate (Sor. Oleate) in a high silica containing formulation was also demonstrated with the addition of other $ML_4$ reducing co-agents, summarized in TABLE III hereinbelow.

TABLE III

Rubber Formulations to Evaluate Mooney Reduction and Test Results Thereof

| Material | Amount (parts per hundred rubber) |
|---|---|
| SBR | 75 |
| PBD | 25 |
| Silica | 80 |
| Carbon Black | 8 |
| Modifier | Variable (see below) |
| Stearic Acid | 1 |
| Naphthenic Oil | 41.25 |
| Wax | 1.5 |
| Resins | 1.5 |
| Stabilizers | 1.17 |
| Zinc Oxide | 1.7 |
| Curatives | 2.4 |
| Sulfur | 2 |

Cured at 171° C. for 20 minutes
Modifier Added (in phr) and $ML_4$/100° C.

| Sample | Si69 (phr) | Modifier 1 | phr | Modifier 2 | phr | $ML_4$/100° C. |
|---|---|---|---|---|---|---|
| C-D | 0 | None | 0 | None | 0 | 161 |
| C-E | 8 | None | 0 | None | 0 | 84 |
| 2 | 0.8 | Sor. Oleate | 4 | None | 0 | 129 |
| 3 | 0.8 | Sor. Oleate | 8 | None | 0 | 104 |

TABLE III-continued

| | | | | | | |
|---|---|---|---|---|---|---|
| C-F | 0.8 | PEG | 4 | None | 0 | 148 |
| C-G | 0.8 | PEG | 8 | None | 0 | 124 |
| C-H | 0.8 | Sorbitol | 4 | None | 0 | 146 |
| C-I | 0.8 | Sorbitol | 8 | None | 0 | 136 |
| 4 | 0 | Sor. Oleate | 4 | OTES | 3 | 73 |
| 5 | 0 | Sor. Oleate | 4 | OTES | 2 | 79 |
| 6 | 0 | Sor. Oleate | 4 | OTES/Talc | 3/2 | 72 |
| 7 | 0 | Sor. Oleate | 4 | OTES/Urea | 3/2 | 70 |
| C-J | 0.8 | None | 0 | Mica | 15 | 122 |
| 8 | 0.8 | Sor. Oleate | 4 | Mica | 15 | 93 |
| 9 | 0.8 | Sor. Oleate | 8 | Mica | 15 | 77 |

OTES = Octyltriethoxysilane

As is demonstrated in TABLE III, the sorbitan oleate processing aid was more effective in reducing $ML_4$ at 100° C. than PEG or sorbitol (Samples C-F to C-I). The addition of a small amount of another silane such as Si69 or OTES gave an even greater $ML_4$ reduction (Samples 2–5). Co-agents like urea, talc and mica also had a large effect on $ML_4$ reduction, especially when used with the sorbitan oleate (Samples 6–9). In fact, there is an effect on $ML_4$ reduction even when a low level of silane is used along with the sorbitan oleate and mica (compare Samples 8–9 with Sample C-J). These results clearly demonstrate the advantage of using a processing aid such as sorbitan oleate to reduce $ML_4$ in silica filled rubber stocks.

We have therefore found that mineral fillers inhibit re-agglomeration of the silica in silica-filled vulcanizable elastomer formulations and maintain the dispersion of the silica, thereby reducing the mixing required and aiding in the processability of the compound through a diminished Mooney viscosity. This is demonstrated by the compounding of the following formulation to screen silica filled, vulcanizable elastomeric compound properties described below in TABLE IV.

TABLE IV

| | Screening Formulation | |
|---|---|---|
| Material | Silica | Carbon Black |
| Polymer | 100 | 100 |
| Silica | 40 | |
| Carbon Black | 8 | 45 |

TABLE IV-continued

| | Screening Formulation | |
|---|---|---|
| Material | Silica | Carbon Black |
| Si-69 | 1 | |
| Dicyclohexylamine | 1 | 1 |
| Antioxidant | 1 | 1 |
| Stearic Acid | 2 | 2 |
| Sulfur | 1.4 | 1.4 |
| Accelerators | 2.4 | 2.4 |
| Zinc Oxide | 3 | 3 |
| Totals | 159.8 | 155.8 |

In this basic formulation, without oil, five parts (by weight) of the silica were replaced with five parts of either mica, talc, or clay and compounded with a rubber specifically terminated to interact with filler through residual terminal methylsilylphenoxy groups. The rubber had been terminated with methyltriphenoxysilane (MeSi(OPh)$_3$). Both a silica and carbon black filled stock were used as controls in these examples, as set forth in TABLE V.

TABLE V

Partial Silica Replacement with Mineral Fillers

| Sample | C-K | 10 | 11 | 12 | C-L |
|---|---|---|---|---|---|
| Additive | | Talc | Mica | Clay | Carbon Black |
| Silica | 40 | 35 | 35 | 35 | |
| Carbon Black | 8 | 8 | 8 | 8 | 45 |
| Talc | | 5 | | | |
| Mica | | | 5 | | |
| Clay | | | | 5 | |

The properties of the compounds and the cured stocks are presented in TABLE VI. The uncured compound $ML_{1+4}$ at 100° C. of the stocks containing talc and mica were significantly lower than the all silica control. Moreover, the minimum torques (ML) by Monsanto Rheometer were also lower, indicative of a more processable stock. The hardness and MH of the talc and mica stocks indicated a slightly lower state of cure, although only slight differences were shown in the tensile properties.

TABLE VI

Physical Test Results

| Sample | C-K | 10 | 11 | 12 | C-L |
|---|---|---|---|---|---|
| Cpd $ML_{1+4}$ 100° C. | 107.8 | 96.7 | 97.5 | 102.7 | 88.1 |
| Monsanto Rheometer | | | | | |
| ML | 9.55 | 8.06 | 8.40 | 8.78 | 6.53 |
| TS$_2$ | 3'37" | 3'42" | 3'46" | 3'39" | 1'32" |
| TC$_{90}$ | 12'39" | 10'24" | 10'31" | 10'42" | 3'17" |
| MH | 43.39 | 41.27 | 41.47 | 42.38 | 34.60 |
| Shore A | 69 | 65 | 66 | 67 | 67 |
| Pendulum Rebound 65° C. | 69.8 | 71.2 | 71.8 | 71.2 | 63.6 |
| Ring Tensile 24° C. | | | | | |
| 100% Mod. | 598 | 589 | 550 | 558 | 569 |
| Max. Stress (psi) | 2177 | 2186 | 2090 | 1885 | 2636 |
| Max. Strain (%) | 298 | 309 | 302 | 289 | 311 |
| Ring Tensile 100° C. | | | | | |
| 100% Mod. | 473 | 471 | 443 | 494 | 370 |
| Max. Stress (psi) | 1002 | 933 | 918 | 948 | 1712 |
| Max. Strain (%) | 190 | 184 | 188 | 182 | 272 |

TABLE VI-continued

Physical Test Results

| Sample | C-K | 10 | 11 | 12 | C-L |
|---|---|---|---|---|---|
| Ring Tear 171° C. lb/in | 82 | 68 | 65 | 62 | 95 |
| Tan δ (@ 7% Elongation) 65° C. | 0.070 | 0.063 | 0.064 | 0.074 | 0.121 |
| G', MPa | 3.131 | 3.004 | 3.041 | 3.163 | 2.752 |
| ΔG', MPa | 0.586 | 0.549 | 0.534 | 0.655 | 0.811 |
| Wet Skid | 45 | 47 | 44 | 43 | 37 |

Further testing of silica-filled vulcanizable elastomeric compounds was conducted to determine the effect of additional mineral fillers and the use of sorbitan oleate as a processing aid in the stock formulations. These examples are described in TABLES VII, VIII, X and XII, and results of the tests reported in TABLES IX, XI, XIII and XIV.

Compound properties displayed in TABLE IX indicated a lower raw compound $ML_{1+4}$ at 100° C. with lower T80, and lower minimum torque, ML indicative of an easier processing stock. Tensile properties of the cured stocks were not adversely affected by the mica or talc at these levels and neither was the hardness or state of cure. Further, hot ring tear was improved compared to the control. Rebound and Tan δ were indicative of lower rolling resistance stocks.

TABLE VII

Basic Formulation (C-M)

| | Parts |
|---|---|
| Masterbatch Material | |
| SBR | 90.75 |
| BR | 25 |
| Silica | 80 |
| Mica | Variable |
| Talc | Variable |
| Sorbitan Monooleate | Variable |
| Si69, Neat | Variable |
| Carbon Black | 8 |
| Oil | 25.5 |

TABLE VII-continued

Basic Formulation (C-M)

| | Parts |
|---|---|
| Stearic Acid | 1 |
| Wax Blend | 1.5 |
| Resin | 3 |
| Final Mixing Material | |
| Masterbatch | (as above) |
| Processing Aid | 0.95 |
| Antiozonant | 0.22 |
| Zinc Oxide | 1.7 |
| Resin | 2.5 |
| Accelerators | 2.4 |
| Sulfur | Variable |

TABLE VIII

Partial Silica Replacement with Talc or Mica

| Sample | C-M | 13 | 14 | 15 | 16 | 17 |
|---|---|---|---|---|---|---|
| Silica (phr) | 80 | 78.5 | 76.4 | 72.7 | 76.6 | 73.3 |
| Talc (phr) | 0 | 2 | 5 | 10 | 0 | 0 |
| Mica (phr) | 0 | 0 | 0 | 0 | 5 | 10 |
| Accelerator (phr) | 2.4 | 2.4 | 2.4 | 2.4 | 2.4 | 2.4 |
| Sulfur (phr) | 1.6 | 1.6 | 1.6 | 1.6 | 1.6 | 1.6 |
| Si69 (phr) | 8 | 8 | 8 | 8 | 8 | 8 |

TABLE IX

Physical Test Results
Partial Replacement of Silica with Talc or Mica

| Sample | C-M | 13 | 14 | 15 | 16 | 17 |
|---|---|---|---|---|---|---|
| Mooney Viscometer | | | | | | |
| $ML_{1+4}$ (100° C.) | 82.0 | 80.3 | 77.9 | 71.0 | 76.7 | 71.7 |
| $T_{80}$ (seconds) | 44.3 | 42.9 | 34.7 | 24.5 | 33.7 | 26.5 |
| Monsanto Cure (170° C.) | | | | | | |
| ML | 12.14 | 12.04 | 11.46 | 10.37 | 11.41 | 10.47 |
| $TS_2$ | 2'31" | 2'30" | 2'29" | 2'32" | 2'37" | 2'30" |
| $TC_{90}$ | 13'52" | 13'08" | 12'11" | 11'37" | 12'22" | 11'56" |
| MH | 35.38 | 35.95 | 35.69 | 33.97 | 35.48 | 34.60 |
| Ring Tensile @ 23° C. | | | | | | |
| 100% Modulus | 281 | 294 | 335 | 323 | 319 | 315 |
| Max. Stress (psi) | 2434 | 2449 | 2601 | 2709 | 2634 | 2510 |
| Max. % Strain | 436 | 430 | 425 | 417 | 436 | 413 |
| Ring Tensile @ 100% | | | | | | |
| 100% Modulus | 314 | 258 | 283 | 253 | 274 | 305 |
| Max. Stress (psi) | 1580 | 1405 | 1447 | 1264 | 1471 | 1485 |
| Max. % Strain | 436 | 430 | 425 | 417 | 436 | 413 |

TABLE IX-continued

Physical Test Results
Partial Replacement of Silica with Talc or Mica

| Sample | C-M | 13 | 14 | 15 | 16 | 17 |
|---|---|---|---|---|---|---|
| Ring Tear Strength @ 170° C. (lb/in) | 189 | 239 | 238 | 215 | 256 | 227 |
| Pendulum Rebound 65° C. | 50.6 | 51.6 | 52.2 | 54.4 | 52.6 | 53.2 |
| Shore "A" Hardness | 66.0 | 70.0 | 69.0 | 65.0 | 65.0 | 67.0 |
| Rheometrics @ 65° C. | | | | | | |
| Tan δ @ 7% Strain | 0.1871 | 0.1825 | 0.1866 | 0.1730 | 0.1694 | 0.1740 |
| ΔG', MPa | 6.201 | 7.237 | 6.825 | 4.949 | 6.033 | 5.498 |

TABLE X lists variations in order to maintain a constant volume fraction filler in the basic formulation, provided in TABLE VII. Among these variations were included two types of mica to replace some silica and replacement of Si69 with sorbitan monooleate and silica with a non reinforcing carbon black, N880. The mica utilized contained 16% Mg and is considered to be the mineral biotite, whereas C-3000 (available from KMG Minerals Inc, Kings Mountain, N.C.) is muscovite and contains very little magnesium. Properties for these formulations are displayed in TABLE XI.

A least squares estimate of the $ML_{1+4}$ at 100° C. and 0.8 parts Si69 was 137 in the all silica formulation. Addition of up to 15 parts mica caused a significant decrease in the observed value which was enhanced by the addition of sorbitan monooleate. There was an unexpected synergism of these additives on reduction of $ML_{1+4}$, t80, and ML. MH, tensile, and hardness, all indicative of a lower state of cure, were reduced by the sorbitan monooleate. These effects were also reflected in the tensile retraction data as well.

Adjustment of curatives compensated for the lower cure rate. Even at the lower state of cure, these stocks had lower Tan δ values indicative of lower rolling resistance and increased fuel efficiency. This was further enhanced with a tighter cure.

TABLE X

Partial Silica Replacement with Mica

| Sample | C-N | C-O | C-P | C-Q | C-R | C-S | 18 | 19 | 20 | 21 | 22 | 23 | C-T | C-U | 24 |
|---|---|---|---|---|---|---|---|---|---|---|---|---|---|---|---|
| Silica (phr) | 80 | 80 | 80 | 80 | 80 | 80 | 80 | 80 | 72.8 | 69.2 | 69.2 | 69.2 | 73.3 | 73.3 | 69.2 |
| Mica (phr) | 0 | 0 | 0 | 0 | 0 | 0 | 0 | 0 | 10 | 15 | 15 | 15 | 0 | 0 | 15 |
| Mica Type | — | — | — | — | — | — | — | — | B | B | B | M | — | — | M |
| N880 (phr) | 0 | 0 | 0 | 0 | 0 | 0 | 0 | 0 | 0 | 0 | 0 | 0 | 0 | 6.21 | 0 |
| Sorbitan Monooleate | 0 | 0 | 0 | 0 | 0 | 0 | 4 | 8 | 0 | 0 | 4 | 8 | 0 | 0 | 0 |
| Accelerator 1 (phr) | 1.6 | 1.9 | 2.2 | 2.5 | 2.2 | 2.2 | 2.2 | 2.2 | 2.2 | 2.2 | 2.5 | 2.2 | 1.6 | 1.6 | 2.2 |
| Sulfur (phr) | 1.6 | 1.5 | 1.4 | 1.3 | 1.6 | 1.2 | 1.8 | 1.8 | 1.8 | 1.8 | 1.7 | 1.9 | 1.6 | 1.6 | 1.8 |
| Si69 (phr) | 8 | 8 | 8 | 8 | 4 | 12 | 0.8 | 0.8 | 0.8 | 0.8 | 0.8 | 0 | 8 | 8 | 0.8 |
| Accelerator 2 (phr) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |

B = BIOTITE
M = MUSCOVITE

TABLE XI

Physical Test Results
Partial Replacement of Silica with Mica

| Sample | C-N | C-O | C-P | C-Q | C-R | C-S | 18 |
|---|---|---|---|---|---|---|---|
| Mooney Viscometer | | | | | | | |
| $ML_{1+4}$ @ 100° C. | 82.9 | 78.4 | 79.8 | 81.3 | 119.7 | 68.1 | 129.1 |
| $T_{80}$ | 38.8 | 31.3 | 34.7 | 35 | 1154 | 17 | 730 |
| Monsanto Cure @ 170° C. | | | | | | | |
| ML | 12.81 | 12.46 | 12.08 | 12.46 | 19.82 | 10.03 | 24.59 |
| $TS_2$ | 2'29" | 2'29" | 2'34" | 2'31" | 2'07" | 2'18" | 2'17" |
| $TC_{90}$ | 13'16" | 11'36" | 9'29" | 7'37" | 17'43" | 11'03" | 17'52" |
| MH | 36.91 | 36.71 | 35.45 | 36.68 | 42.95 | 38.12 | 44.36 |

TABLE XI-continued

Physical Test Results
Partial Replacement of Silica with Mica

Ring Tensile @ 23° C.

| | | | | | | | |
|---|---|---|---|---|---|---|---|
| 100% Modulus | 362 | 327 | 343 | 351 | 294 | 390 | 236 |
| Max. Stress (psi) | 2793 | 2537 | 2798 | 2760 | 2479 | 2521 | 2216 |
| Max. % Strain | 511 | 504 | 525 | 518 | 557 | 457 | 729 |

Ring Tensile @ 100° C.

| | | | | | | | |
|---|---|---|---|---|---|---|---|
| 100% Modulus | 353 | 293 | 285 | 326 | 294 | 355 | 183 |
| Max. Stress (psi) | 1555 | 1464 | 1418 | 1538 | 1470 | 1386 | 1444 |
| Max. % Strain | 363 | 394 | 386 | 379 | 411 | 333 | 739 |
| Ring Tear @ 170° C. Strength (lb/in) | 245 | 257 | 243 | 237 | 233 | 280 | 176 |
| Pendulum Rebound 65° C. | 51.8 | 51.8 | 52.0 | 52.8 | 52.2 | 54.8 | 49.0 |
| Shore "A" Hardness | 72.0 | 69.0 | 70.0 | 70.0 | 72.0 | 70.0 | 68.0 |

Rheometric @ 65° C.

| | | | | | | | |
|---|---|---|---|---|---|---|---|
| Tan δ @ 7% Strain | 0.1815 | 0.1834 | 0.1904 | 0.19 | .01707 | 0.1751 | 0.1837 |
| ΔG', MPa | 8.329 | 8.247 | 8.754 | 9.227 | 9.267 | 7.488 | 9.762 |

Tensile Retraction

| | | | | | | | |
|---|---|---|---|---|---|---|---|
| $M_0$ (×10$^{-4}$), g/mol | 1.23 | 1.15 | 1.25 | 1.14 | 1.26 | 1.05 | 1.43 |
| Slope (×10$^{-3}$), g/mol | 3.06 | 3.07 | 3.16 | 3.09 | 3.73 | 2.86 | 4.95 |
| β (×10$^{-3}$), g/mol | 5.70 | 5.91 | 5.99 | 5.11 | 4.06 | 5.55 | 3.90 |

| Sample | 19 | 20 | 21 | 22 | 23 | C-T | C-U | 24 |
|---|---|---|---|---|---|---|---|---|

Mooney Viscometer

| | | | | | | | | |
|---|---|---|---|---|---|---|---|---|
| $ML_{1+4}$ @ 100° C. | 103.5 | 135.7 | 122.0 | 92.7 | 76.6 | 69.8 | 73.6 | 123.6 |
| $T_{80}$ | 300 | 1510 | 592 | 109.5 | 27.2 | 18.7 | 21.4 | 1316.6 |

Monsanto Cure @ 170° C.

| | | | | | | | | |
|---|---|---|---|---|---|---|---|---|
| ML | 19.28 | 26.83 | 23.03 | 16.46 | 13.63 | 10.03 | 10.37 | 22.59 |
| $TS_2$ | 2'39" | 1'53" | 1'57" | 2'30" | 3'13" | 2'27" | 2'20" | 1'49" |
| $TC_{90}$ | 15'24" | 18'45" | 18'24" | 13'16" | 12'10" | 12'06" | 10'49" | 18'45" |
| MH | 39.24 | 47.72 | 44.36 | 37.25 | 31.80 | 33.35 | 34.57 | 43.14 |

Ring Tensile @ 23° C.

| | | | | | | | | |
|---|---|---|---|---|---|---|---|---|
| 100 % Modulus | 191 | 273 | 258 | 205 | 166 | 237 | 265 | 271 |
| Max. Stress (psi) | 1916 | 2389 | 2281 | 2123 | 1559 | 2551 | 2796 | 2283 |
| Max. % Strain | 768 | 665 | 675 | 782 | 831 | 616 | 618 | 678 |

Ring Tensile @ 100° C.

| | | | | | | | | |
|---|---|---|---|---|---|---|---|---|
| 100% Modulus | 151 | 208 | 231 | 176 | 134 | 268 | 287 | 280 |
| Max. Stress (psi) | 1296 | 1311 | 1402 | 1399 | 959 | 1392 | 1381 | 1242 |
| Max. % Strain | 821 | 585 | 584 | 745 | 826 | 433 | 414 | 530 |
| Ring Tear @ 170° C. Strength (lb/in) | 278 | 272 | 247 | 267 | 212 | 260 | 246 | 237 |
| Pendulum Rebound 65° C. | 46.8 | 51.8 | 53.0 | 51.4 | 47.6 | 53 | 52.8 | 51.6 |
| Shore "A" Hardness | 66.0 | 75.0 | 70.0 | 65.0 | 62.0 | 67.0 | 69.0 | 75.0 |

Rheometric @ 65° C.

| | | | | | | | | |
|---|---|---|---|---|---|---|---|---|
| Tan δ @ 7% Strain | 0.1935 | 0.1791 | 0.1798 | 0.1819 | 0.1932 | 0.1851 | 0.1792 | 0.1701 |
| ΔG', MPa | 8.351 | 9.676 | 8.826 | 7.022 | 5.185 | 5.749 | 5.656 | 10.165 |

Tensile Retraction

| | | | | | | | | |
|---|---|---|---|---|---|---|---|---|
| $M_0$ (×10$^{-4}$), g/mol | 1.6 | 1.26 | 1.29 | 1.59 | 1.87 | 1.10 | 1.10 | 1.26 |
| Slope (×10$^{-3}$), g/mol | 5.63 | 4.69 | 5.12 | 5.53 | 7.03 | 2.93 | 2.98 | 4.94 |
| β (×10$^{-3}$), g/mol | 4.07 | 3.42 | 4.35 | 5.61 | 7.95 | 6.35 | 6.72 | 4.02 |

TABLE XII describes additional variations in formulation as well as including other types of mica. The particular mica was unimportant in the ML4 reduction which ranged from about 12 to 14 points at 15 parts mica per 100 rubber, shown in TABLE XIII. Nor, were there significant effects of mica type on ML or $T_{80}$ reductions. The mica stocks showed higher rebound and reduced tan δ values at comparable states of cure as judged from tensile properties. Hardness values indicated a lower state of cure for the mica stocks however, a change of filler type may not allow direct comparison of hardness to judge state of cure.

TABLE XII

Partial Silica Replacement with Mica
Change of Cure System

| Sample | C-V | C-W | C-X | C-Y | 25 | 26 | 27 | 28 | 29 | C-Z |
|---|---|---|---|---|---|---|---|---|---|---|
| Recipe Per Previous Stock | C-P | C-P | C-P | C-P | C-P | C-P | C-P | C-P | C-P | C-P |
| ZnO (phr) | 1.70 | 2.40 | 3.00 | 3.00 | 1.70 | 1.70 | 1.70 | 3.00 | 3.00 | 1.70 |
| Stearic Acid (phr) | 1.00 | 1.00 | 1.00 | 2.00 | 1.00 | 1.00 | 1.00 | 1.00 | 1.00 | 1.00 |
| Silica (phr) | 80 | 80 | 80 | 80 | 69.2 | 69.2 | 69.2 | 69.2 | 69.2 | 80 |
| Mica Muscovite (phr) | 0 | 0 | 0 | 0 | 15 | 0 | 0 | 0 | 0 | 0 |
| Water Ground 325 Mesh Mica Muscovite (phr) | 0 | 0 | 0 | 0 | 0 | 15 | 0 | 0 | 0 | 0 |
| C3000-SM-M (phr) Silane Treated | 0 | 0 | 0 | 0 | 0 | 0 | 15 | 15 | 15 | 0 |
| Si69/CB Mixture (1:1) (phr) | 16 | 16 | 16 | 16 | 16 | 16 | 16 | 16 | 0(*) | 16 |
| Sulfur (phr) | 1.40 | 1.40 | 1.40 | 1.40 | 2.20 | 2.20 | 2.20 | 2.20 | 2.20 | 2.20 |

(*)Add 8.0 phr N330 Carbon Black to Compensate for that in 16.00 phr

TABLE XIII

Physical Test Results
Effect of Presence of Mica, Type of Mica and of Cure System
Variations at Constant Mixing Energy Input (238.4 w-hrs/lb)

| Sample | C-V | C-W | C-X | C-Y | 25 | 26 | 27 | 28 | 29 | C-Z |
|---|---|---|---|---|---|---|---|---|---|---|
| Mooney Viscometer | | | | | | | | | | |
| $ML_{1+4}$ 100° C. | 75.7 | 73.4 | 74.5 | 71.5 | 58.7 | 60.1 | 60.4 | 60.2 | 125.1 | 72.7 |
| $T_{80}$ | 24.1 | 22.7 | 24.1 | 22.4 | 19.7 | 15.9 | 15.6 | 14.6 | >300.6 | 26.1 |
| Monsanto Cure (170° C.) | | | | | | | | | | |
| ML | 11.6 | 11.17 | 11.36 | 10.59 | 8.94 | 8.85 | 9.38 | 8.60 | 25.86 | 10.97 |
| $TS_2$ | 2'30" | 2'31" | 2'36" | 2'42" | 2'19" | 2'21" | 2'18" | 2'27" | 2'11" | 2'12" |
| $TC_{90}$ | 10'01" | 9'43" | 10'11" | 8'49" | 11'01" | 10'49" | 11'07" | 11'53" | 20'49" | 12'55" |
| MH | 37.37 | 37.08 | 37.70 | 35.43 | 39.44 | 39.16 | 40.70 | 38.43 | 48.24 | 41.52 |
| Ring Tensile @ 23° C. | | | | | | | | | | |
| 100% Modulus | 318 | 333 | 327 | 301 | 393 | 430 | 387 | 368 | 256 | 368 |
| MAX. Stress (psi) | 2809 | 3107 | 2927 | 2819 | 2604 | 2766 | 2681 | 2452 | 1886 | 2714 |
| Energy To Break (psi) | 6596 | 7435 | 7132 | 7038 | 5540 | 5977 | 5989 | 5212 | 5293 | 5399 |
| Ring Tensile @ 100° C. | | | | | | | | | | |
| 100% Modulus | 268 | 276 | 281 | 248 | 321 | 347 | 366 | 341 | 220 | 366 |
| Max. Stress (psi) | 1263 | 1631 | 1503 | 1483 | 1093 | 1255 | 1376 | 1436 | 1212 | 1811 |
| Max. % Strain | 364 | 439 | 417 | 451 | 324 | 334 | 341 | 368 | 671 | 361 |
| Ring Tear @ 170° C. Tear Strength (lb/in) | 276 | 307 | 305 | 322 | 253 | 253 | 261 | 246 | 240 | 253 |
| Pendulum Rebound 65° C. | 53.6(*) | 53.0(*) | 54.8 | 53.6 | 59.6 | 58.8 | 58.8 | 58.6 | 51.2 | 55.8 |
| Shore "A" Hardness | 65.0 | 67.0 | 67.0 | 68.0 | 68.0 | 68.0 | 67.0 | 68.0 | 72.0 | 70.0 |
| Rheometrics @ 65° C. | | | | | | | | | | |
| Tan δ @ 7% Strain | 0.1839 | 0.1868 | 0.1764 | 0.1855 | 0.1436 | 0.1458 | 0.1471 | 0.1480 | 0.1679 | 0.1875 |
| ΔG', MPa | 6.881 | 6.167 | 5.950 | 5.290 | 4.745 | 5.146 | 5.063 | 4.792 | 10.08 | 5.831 |

(*)Samples not well molded

TABLE XIV lists the results of controlled mix studies into which a known energy input was applied to a mix after the Si69 was added in the presence of mica, talc, and/or sorbitan monooleate. It has been established that β, an inverse measure of filler association or crosslink density, as determined by tensile retraction, can be increased by more mixing energy. This effect can be calculated from the slope of 33.99 g/mol mix energy, and intercept, 1349 g/mol, (see drawing figure) and applied to the mix energy supplied to the samples.

The data in TABLE XIV have been sorted by increasing Si69, Mica, and Talc in that order. The Δβ value, the increase in β over that expected, increased with Si69 and the Mica and Talc level and have thusly been grouped. The two exceptions were the combination of Mica (15 parts) with sorbitan monooleate (8 parts) and the sorbitan monooleate alone (8 parts) which showed much higher β than expected from mix energy calculations alone.

TABLE XIV

Tensile Retraction of Controlled Energy Mixes
Energy After Si69 was Added to a 280 g Brabender

| Sample | Mr g/mol | S g/mol | S/Mr | β g/mol | Energy W/H | Si69 phr | Sulfur phr |
|---|---|---|---|---|---|---|---|
| 23 | 16700 | 7034 | 0.421 | 7947 | 112.17 | 0 | 1.9 |
| 20 | 109.13 | 4910 | 0.450 | 2057 | 72.73 | 0.8 | 2 |
| 18 | 14270 | 4945 | 0.347 | 3899 | 106.13 | 0.8 | 1.8 |
| 30 | 16040 | 5626 | 0.351 | 4069 | 103.83 | 0.8 | 1.8 |
| 19 | 11387 | 2686 | 0.236 | 5811 | 75.40 | 0.8 | 2 |
| 20 | 12630 | 4690 | 0.371 | 3415 | 101.44 | 0.8 | 1.8 |
| 31 | 12640 | 4944 | 0.391 | 4022 | 104.93 | 0.8 | 1.8 |
| 24 | 12930 | 5122 | 0.396 | 4354 | 113.16 | 0.8 | 1.8 |
| 22 | 15875 | 5532 | 0.348 | 5615 | 123.10 | 0.8 | 1.7 |
| 17 | 10475 | 2547 | 0.243 | 5697 | 147.00 | 8 | 2.2 |
| 25 | 12184 | 3247 | 0.268 | 6668 | 147.00 | 8 | 1.4 |
| C-V | 10980 | 2928 | 0.267 | 6346 | 117.05 | 8 | 1.6 |
| C-U | 12304 | 3061 | 0.249 | 5702 | 93.51 | 8 | 1.6 |
| 28 | 12890 | 3010 | 0.234 | 5579 | 80.37 | 8 | 1.8 |
| C-T | 11040 | 2980 | 0.270 | 6716 | 109.72 | 8 | 1.6 |
| C-M | 12656 | 3130 | 0.247 | 6058 | 87.65 | 8 | 1.6 |
| 13 | 12398 | 3352 | 0.270 | 6835 | 88.70 | 8 | 1.6 |
| 14 | 12690 | 3443 | 0.271 | 7380 | 96.59 | 8 | 1.6 |
| 15 | 12491 | 3270 | 0.262 | 6706 | 89.88 | 8 | 1.6 |
| 16 | 12579 | 3423 | 0.272 | 7880 | 92.61 | 8 | 1.6 |
| 32 | 9111 | 3098 | 0.340 | 8289 | 147.00 | 8 | 2.2 |
| C-Z | 9299 | 3082 | 0.331 | 8309 | 147.00 | 8 | 2.2 |
| 26 | 9348 | 3155 | 0.338 | 8630 | 147.00 | 8 | 2.2 |
| 27 | 9849 | 3141 | 0.319 | 8708 | 147.00 | 8 | 2.2 |

| Sample | ACC phr | MICA phr | TALC phr | SO phr | CALC β g/mol | Δβ g/mol |
|---|---|---|---|---|---|---|
| 23 | 3.0 | 15 | 0 | 8 | 5161 | 2786 |
| 20 | 2.4 | 0 | 0 | 0 | 3820 | -1763 |
| 18 | 3.0 | 0 | 0 | 4 | 4956 | -1057 |
| 30 | 3.0 | 0 | 0 | 8 | 4878 | -809 |
| 19 | 2.4 | 0 | 0 | 8 | 3912 | 1899 |
| 20 | 3.0 | 10 | 0 | 0 | 4796 | -1381 |
| 31 | 3.0 | 15 | 0 | 0 | 4915 | -893 |
| 24 | 3.0 | 15 | 0 | 0 | 5195 | -841 |
| 22 | 3.0 | 15 | 0 | 4 | 5533 | 82 |
| 17 | 2.4 | 0 | 0 | 0 | 6345 | -648 |
| 25 | 3.0 | 0 | 0 | 0 | 6345 | 323 |
| C-V | 2.4 | 0 | 0 | 0 | 5327 | 1019 |
| C-U | 2.4 | 0 | 0 | 0 | 4527 | 1175 |
| 28 | 3.0 | 0 | 0 | 0 | 4080 | 1499 |
| C-T | 2.4 | 0 | 0 | 0 | 5078 | 1638 |
| C-M | 2.4 | 0 | 2 | 0 | 4328 | 1730 |
| 13 | 2.4 | 0 | 5 | 0 | 4363 | 2472 |
| 14 | 2.4 | 0 | 10 | 0 | 4632 | 2748 |
| 15 | 2.4 | 5 | 0 | 0 | 4403 | 2303 |
| 16 | 2.4 | 10 | 0 | 0 | 4496 | 3384 |
| 32 | 2.4 | 15 | 0 | 0 | 6345 | 1944 |
| C-Z | 2.4 | 15 | 0 | 0 | 6345 | 1964 |
| 26 | 2.4 | 15 | 0 | 0 | 6345 | 2285 |
| 27 | 2.4 | 15 | 0 | 0 | 6345 | 2363 |

It is therefore unexpected that mica and talc should decrease the filler interaction and increase β as their levels were increased. Further, sorbitan monooleate, alone and in concert with mica, acted to increase the observed β and thus reduce filler interaction.

Further testing of silica-filled vulcanizable elastomeric compounds was conducted to determine the effect of mineral fillers and the use of polyoxyethylene derivatives of fatty acid esters of hydrogenated and non-hydrogenated sugars as processing aids in the stock formulations. These examples are described in TABLE XV with the results of the tests conducted to evaluate and compare physical properties. As a Control, Sample C-C was prepared as above, without any fatty acid ester additives. The ethoxylated species (Tweens) are presented as Samples 30, 32, 33 and 37 and are compared against analogous sorbitans (Spans, non-ethoxylated), Samples 31, 34, 35 and 36. The Samples contained carbon black 35 phr, 30 phr of silica and 3 parts by weight of Si69 (10 percent per weight of silica) and were prepared with the formulation as set forth in Table II, Sample C-C, to which the processings aids of Table XV were added. The processing aids included Spans (fatty acid esters) and Tweens (polyoxyethylene fatty acid esters).

TABLE XV

Physical Test Results
Effect of Partial Replacement of Silica with Sorbitan Esters

| Sample | C-C | 30 | 31 | 32 | 33 | 34 | 35 | 36 | 37 |
|---|---|---|---|---|---|---|---|---|---|
| Additive | — | Tween 80 | Span 80 | Tween 60 | Tween 85 | Span 60 | Span 85 | Span 80 | Tween 80 |
| Level, phr | — | 3 | 3 | 3 | 3 | 3 | 3 | 1.5 | 1.5 |
| *Mooney Viscosity* | | | | | | | | | |
| $ML_{1+4}$ 100° C. | 60.3 | 52 | 50.2 | 53.8 | 50.5 | 49.5 | 52.3 | 53.5 | 56.7 |
| $T_{80}$ | 7.8 | 6.7 | 6.7 | 6.7 | 5.3 | 5.4 | 5.7 | 5.7 | 6 |
| *Monsanto Cure (165° C.)* | | | | | | | | | |
| ML* | 2.56 | 2.34 | 1.87 | 2.43 | 7.25 | 8.52 | 7.25 | 7.44 | 8.17 |
| $TS_2$ | 2'58" | 3'27" | 3'30" | 3'33" | 4'47" | 4'41" | 4'27" | 4'22" | 4'38" |
| $TC_{90}$ | 9'43" | 11'46' | 11'29" | 11'56" | 14'38" | 13'34" | 12'16" | 12'25" | 11'56" |
| MH* | 15.69 | 16.42 | 14.68 | 17.94 | 40.36 | 37.88 | 37.88 | 38.55 | 41.67 |
| *Ring Tensile @ 24° C.* | | | | | | | | | |
| 100% Modulus | 465 | 485 | 600 | 472 | 363 | 446 | 393 | 383 | 394 |
| Max. Stress (psi) | 2278 | 2264 | 3595 | 2218 | 3274 | 2956 | 2961 | 2706 | 2466 |
| Energy To Break (in-lbs/in$^3$) | 3374 | 3398 | 6380 | 3384 | 4169 | 5403 | 5705 | 4965 | 4319 |
| *Ring Tensile @ 100° C.* | | | | | | | | | |
| 100% Modulus | 371 | 387 | 379 | 375 | 329 | 298 | 315 | 338 | 346 |
| Max. Stress (psi) | 1228 | 1255 | 1268 | 1272 | 1492 | 1216 | 1417 | 1437 | 1389 |
| Max. % Strain | 257 | 251 | 260 | 263 | 311 | 288 | 313 | 304 | 286 |

TABLE XV-continued

Physical Test Results
Effect of Partial Replacement of Silica with Sorbitan Esters

| Sample | C-C | 30 | 31 | 32 | 33 | 34 | 35 | 36 | 37 |
|---|---|---|---|---|---|---|---|---|---|
| Ring Tear @ 171° C Tear Strength (lb/in) | — | — | — | — | 112 | 148 | 123 | 124 | 118 |
| Pendulum Rebound 65° C. | 51.4 | 53 | 52 | 53 | 50.2 | 50 | 51.8 | 50.6 | 50.8 |
| Rheometrics | | | | | | | | | |
| Tan δ @ 7% Strain | 0.1389 | 0.1207 | 0.1232 | 0.1088 | 0.1155 | 0.1214 | 0.1209 | 0.1319 | 0.1266 |
| ΔG', MPa at 65° C. | 2.752 | 2.922 | 2.243 | 2.551 | 2.417 | 2.475 | 2.144 | 2.45 | 2.697 |

*ML and MH values for Samples C-C and 30–32 were measured on a Monsanto MDR 2000 rheometer and ML and MH values for Samples 33–37 were measured on a Monsanto ODR rheometer.

As is apparent from the physical properties reported in Table XV, the ethoxylated sorbitans (Tweens) provided improved properties over the Control and generally performed as well as the sorbitans (Spans). All aids were fairly well equivalent, showing reduced Mooney viscosity and torque while desired physical properties remained. Unexpectedly, the need for adjacent hydroxyls in the sorbitan molecule, as taught by Canadian Pat. No. 2,184,932 to Semerit, was found to be unfounded as the use tri-oleates, which contain only a single hydroxyl, were effective in producing processability as was equally true for the polysorbates which are polyethoxylated and thus, contain no adjacent hydroxyls.

Thus, it should be evident that the process of the present invention is useful in improving the processability of formulations of diene polymer elastomers containing silica filler by reducing the viscosity of silica-filled elastomeric vulcanizable compounds. It is further demonstrated that the present invention provides vulcanizable silica-filled elastomeric compounds having enhanced physical properties. Practice of the present invention allows a reduction of silanes which are added to vulcanizable rubber compositions containing silica fillers. The reduction can be effected by the addition of the processing aids described herein, mineral and non-mineral fillers as well as combinations of more than one.

It will be appreciated that the processing aids and additional fillers exemplified herein have been provided to demonstrate practice of the invention and are otherwise not to be construed as a limitation on practice of the present invention. Moreover, the processing aids and mineral fillers disclosed herein have been provided for purposes of exemplification only and thus, it is to be appreciated that other materials can be substituted without falling outside of the scope of this invention. Those skilled in the art can readily determine suitable additives and the appropriate manner of formulating elastomeric compositions containing silica fillers. Furthermore, practice of the present invention is not limited to a specific formulation of elastomers.

Based upon the foregoing disclosure, it should now be apparent that the process and related components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

We claim:

1. A sulfur vulcanizable elastomeric compound having a reduced viscosity prior to vulcanization, comprising:

100 parts by weight of an elastomer optionally comprising a terminal alkoxysilane functional group and selected from the group consisting of homopolymers derived from conjugated diene monomers and copolymers comprising monomer units derived from a conjugated diene monomer and a monomer unit selected from the group consisting of monovinyl aromatic monomers and triene monomers;

about 5 to about 100 parts by weight of a reinforcing filler per 100 parts of elastomer, wherein the reinforcing filler is selected from the group consisting of silica filler and mixtures thereof with carbon black;

zero to about 20 percent by weight of a silane, based upon the weight of said silica filler;

sulfur;

a processing aid selected from the group consisting of (i) about one to about 20 parts by weight of a fatty acid ester of a hydrogenated or non-hydrogenated $C_5$ or $C_6$ sugar, (ii) about one to about 20 parts by weight of a polyoxyethylene derivative of a fatty acid ester of a hydrogenated or non-hydrogenated $C_5$ or $C_6$ sugar, and (iii) mixtures of selections from (i) and (ii); and about one to about 40 parts by weight of an additional filler selected from the group consisting of mica, urea, sodium sulfate, and mixtures thereof, wherein the presence of both the processing aid and the additional filler reduces the viscosity of the compound prior to vulcanization compared to a compound comprising the processing aid alone.

2. The compound as set forth in claim 1 wherein the elastomer is styrene-butadiene rubber.

3. The compound as set forth in claim 1, further containing a natural rubber.

4. The compound as set forth in claim 1, wherein the silica filler has a surface area of about 32 to about 400 $m^2/g$.

5. The compound as set forth in claim 1, wherein the silica filler has a pH of about 5.5 to about 7.

6. The compound as set forth in claim 1, wherein the amount of said carbon black ranges from 0 to about 50 parts by weight, per 100 parts by weight of elastomer, and the amount of said reinforcing silica filler ranges from about 1 to about 100 parts, per 100 parts of elastomer, with the proviso that where carbon black is 0, at least 30 phr of silica is employed.

7. The compound as set forth in claim 1, wherein said fatty acid ester of a hydrogenated or non-hydrogenated $C_5$ or $C_6$ sugar is selected from the group consisting of sorbitan monooleate, sorbitan dioleate, sorbitan trioleate, sorbitan sesquioleate, sorbitan laurate, sorbitan palmitate and sorbitan stearate.

8. The compound as set forth in claim 1, wherein said polyoxyethylene derivative of a fatty acid ester of a hydrogenated or non-hydrogenated $C_5$ or $C_6$ sugar is selected from the group consisting of POE (20) sorbitan stearate; POE (20) sorbitan oleate; POE (20) sorbitan trioleate; POE (20) sorbitan sesquioleate; POE (20) sorbitan laurate and POE (20) sorbitan palmitate.

9. The composition as set forth in claim 1, wherein the silane is selected from the group consisting of bis[3-(triethyoxysilyl)-propyl]tetrasulfide, n-octyl triethoxysilane, and mixtures thereof.

* * * * *